Figure 1:
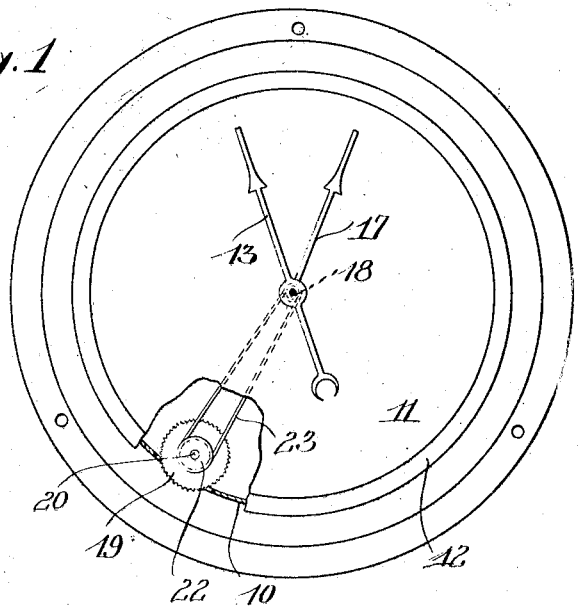

June 14, 1927.

P. R. JAMESON 1,632,736

BAROMETER SETTING MEANS

Filed Dec. 3, 1925

Inventor
Percy R. Jameson
By Edward H. Cumpston
his Attorney

Patented June 14, 1927.

1,632,736

UNITED STATES PATENT OFFICE.

PERCY R. JAMESON, OF ROCHESTER, NEW YORK, ASSIGNOR TO TAYLOR INSTRUMENT COMPANIES, OF ROCHESTER, NEW YORK, A CORPORATION OF NEW YORK.

BAROMETER-SETTING MEANS.

Application filed December 3, 1925. Serial No. 72,902.

The present invention relates to barometer setting means and has for its object more particularly to provide improved means for setting the reference index of an aneroid barometer, or other indicating instrument.

A further object of the invention is to provide improved setting means for the hands or pointers of indicating instruments, particularly of the type in which the hands are positioned behind the glass or other transparent casing cover and supported co-axially on an arbor or spindle, as ordinarily employed in barometers, the improved setting means being adapted to avoid extending an operating connection from the reference pointer through the transparent cover.

A further object of the invention is to provide improved setting means for the hands or pointers of pressure controlled or other types of indicating instruments which is of simple construction, economical to manufacture and convenient to operate.

To these and other ends the invention resides in certain improvements and combinations of parts, all as will be hereinafter more fully described, the novel features being pointed out in the claims at the end of the specification.

In the drawings:—

Figure 2:
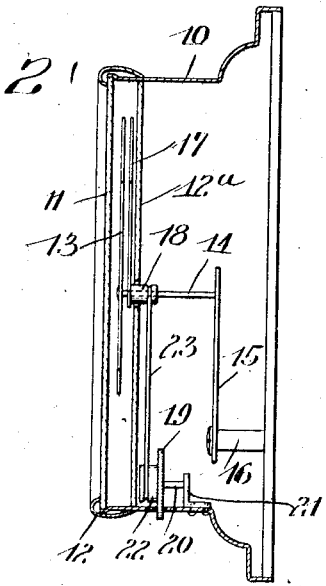

Figure 1 is a front elevational view partly in section illustrating more or less diagrammatically one embodiment of the invention; and Figure 2 is a sectional elevation taken centrally through the instrument shown in Figure 1.

Similar reference numerals throughout the several views indicate the same parts.

The present invention, while shown in connection with an aneroid barometer, is adaptable for use with other scientific indicating instruments, particularly of the class having a pointer or index adapted to travel over a dial, scale plate or chart and with which is associated a reference pointer or index arranged to be set by hand to register or coincide with the indicating pointer at any time desired and adapted to remain stationary so as to indicate the initial starting point or extent of movement for a given time of the automatically controlled index, which may be a temperature or pressure controlled index.

Heretofore in a number of different barometers and other instruments having a manually controlled reference index, the adjusting means therefor has been extended through the crystal or transparent cover for the instrument thus necessitating the drilling of a hole in the glass which renders it liable to fracture and which weakens it and adds considerably to the cost of manufacture through breakage of a number of the crystals during the drilling operations. One object of the present invention is to avoid the objectionable features pointed out above by so constructing and applying the adjusting means for the reference index as to avoid drilling or perforating the glass for instruments of the class described, and also to avoid rotating the dial or scale plate as is done in a number of such instruments.

The present invention, shown by way of illustration in connection with an aneroid barometer of the usual and well known construction including a casing 10 of any suitable design having a glass or transparent cover plate 11 secured by a bezel 12 in the usual manner, a scale plate or dial 12$^a$ which is suitably held within the casing and may be provided with any desired form of pressure scale or graduations suitable for the purpose intended, an index pointer 13 mounted in front of the scale plate on an arbor or spindle 14 projecting forwardly through the scale plate and rotatably supported in the usual manner preferably by an arm or suitable support 15 fixed on a stud or like member 16 which is suitably connected with the casing. For the sake of clearness the constructional details for supporting the spindle 14 on the bracket support 15 as also the aneroid box and the mechanism connected therewith for translating the pressure-responsive movement thereof to the shaft 14, have been omitted.

The reference index or pointer 17 is rotatably supported coaxially with the spindle 14 and is preferably carried thereby through the medium of a wheel or pulley 18 or other suitable member rotatable thereon with which the reference pointer is connected in any desired manner. The casing at any convenient point thereof is slotted to receive a knurled thumb nut 19 or disk-like member adapted to project slightly through the wall of the casing, as indicated in Figure 2. The thumb nut is rigidly mounted on a spindle 20 rotatably supported by a lug or bracket 21 suitably secured within the casing. Connected with the spindle or thumb nut is a wheel or pulley 22 which is operatively connected with the pulley 18 preferably through the medium of a belt 23 of any well known type, such as a flexible band or ribbon or a steel chain if desired. With this arrangement the setting of the reference index 17 to bring it into coincidence with the automatically actuated pointer 13 is easily effected by rotating the nut 19 with the thumb or finger as desired, whereby the belt 23 is driven to actuate the pulley 18 and the pointer 17 thereon.

I claim as my invention:

1. In apparatus of the character described, the combination with a casing having an opening in its wall and containing enclosed therein a scale, a spindle carrying an index co-operating with the scale and operating mechanism for driving the spindle, of an auxiliary index, a pulley revolubly mounted on the spindle and supporting the auxiliary index, and means for moving the pulley about the spindle, including a second pulley mounted within the casing in alignment with the other pulley, an endless band interconnecting the two pulleys and a circular member having a portion exposed through the said opening in the casing, said circular member being operatively connected to the second pulley for turning the same.

2. In a barometer, the combination of a casing having an opening in its wall and a scale plate carried by the casing, a spindle rotatable within the casing and having an index rotatable adjacent the scale plate, a pulley upon the spindle, an index carried by the pulley between the first mentioned index and scale plate, a disk-like member rotatable within the casing and adapted to project through said opening in the wall thereof, a pulley connected with the disk-like member and a belt connecting said pulleys.

PERCY R. JAMESON.